(12) United States Patent
Egawa et al.

(10) Patent No.: US 10,014,502 B2
(45) Date of Patent: Jul. 3, 2018

(54) INORGANIC OXIDE POWDER, SLURRY CONTAINING SAME, NONAQUEOUS ELECTROLYTE SECONDARY BATTERY, AND METHOD FOR MANUFACTURING NONAQUEOUS ELECTROLYTE SECONDARY BATTERY

(71) Applicant: SUMITOMO CHEMICAL COMPANY, LIMITED, Tokyo (JP)

(72) Inventors: Takamasa Egawa, Niihama (JP); Yasuharu Kobashi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/307,963

(22) PCT Filed: Dec. 1, 2015

(86) PCT No.: PCT/JP2015/083748
§ 371 (c)(1),
(2) Date: Oct. 31, 2016

(87) PCT Pub. No.: WO2016/098579
PCT Pub. Date: Jun. 23, 2016

(65) Prior Publication Data
US 2017/0054122 A1    Feb. 23, 2017

(30) Foreign Application Priority Data
Dec. 17, 2014   (JP) .................................. 2014-255465

(51) Int. Cl.
*H01M 4/131* (2010.01)
*H01M 2/16* (2006.01)
(Continued)

(52) U.S. Cl.
CPC ............. *H01M 2/1646* (2013.01); *C01F 7/02* (2013.01); *H01M 2/145* (2013.01); *H01M 2/16* (2013.01);
(Continued)

(58) Field of Classification Search
CPC ...... H01M 2/1646; H01M 4/62; H01M 2/145; H01M 10/0525; H01M 4/139;
(Continued)

(56) References Cited

U.S. PATENT DOCUMENTS 9,150,427 B2   10/2015   Iwata et al.
9,327,991 B2   5/2016    Hyojo et al.
(Continued)

FOREIGN PATENT DOCUMENTS

CN   1806351 A     7/2006
CN   101264913 A   9/2008
(Continued)

OTHER PUBLICATIONS

Office Action dated Mar. 3, 2017, issued by the State Intellectual Property Office of the P.R.C. in corresponding Chinese Application No. 201580023493.3 with Search Report.
(Continued)

*Primary Examiner* — Cynthia K Walls
(74) *Attorney, Agent, or Firm* — Sughrue Mion, PLLC (57) ABSTRACT

The present invention relates to an inorganic oxide powder which is suitably used to form an inorganic oxide porous film having excellent heat resistance, insulation properties and film strength, regardless of a small basis weight, and also having porosity capable of imparting sufficient ion permeability on at least one surface of a positive electrode, a negative electrode, or a separator that constitutes a nonaqueous electrolyte secondary battery. Disclosed is an inorganic oxide powder, wherein: 1) an average three-dimen-
(Continued)

sional particle unevenness is 3.6 or more, and 2) an abundance ratio in number of particles having a particle diameter of less than 0.3 μm is 50% or more.

5 Claims, 2 Drawing Sheets (51) Int. Cl.
| | |
|---|---|
| C01F 7/02 | (2006.01) |
| H01M 4/13 | (2010.01) |
| H01M 4/139 | (2010.01) |
| H01M 10/0566 | (2010.01) |
| H01M 10/058 | (2010.01) |
| H01M 2/14 | (2006.01) |
| H01M 4/62 | (2006.01) |
| H01M 10/0525 | (2010.01) |
| H01M 4/04 | (2006.01) |

(52) U.S. Cl.
CPC ........... *H01M 4/0416* (2013.01); *H01M 4/13* (2013.01); *H01M 4/139* (2013.01); *H01M 4/62* (2013.01); *H01M 10/058* (2013.01); *H01M 10/0525* (2013.01); *H01M 10/0566* (2013.01); *C01P 2004/51* (2013.01); *C01P 2004/62* (2013.01); *C01P 2006/12* (2013.01); *H01M 4/622* (2013.01); *H01M 2220/20* (2013.01); *H01M 2220/30* (2013.01)

(58) Field of Classification Search
CPC ...... H01M 10/0566; H01M 2/16; H01M 4/13; H01M 10/058; H01M 2220/30; C01F 7/02; C01P 2006/12; C01P 2004/62; C01P 2004/51

See application file for complete search history.

(56) References Cited

U.S. PATENT DOCUMENTS

| | | | |
|---|---|---|---|
| 9,577,237 B2 | 2/2017 | Ozaki et al. | |
| 2006/0105245 A1* | 5/2006 | Ikuta | H01M 2/164 |
| | | | 429/246 |
| 2008/0070107 A1* | 3/2008 | Kasamatsu | H01M 2/164 |
| | | | 429/144 |
| 2008/0220327 A1* | 9/2008 | Kim | H01M 2/145 |
| | | | 429/164 |
| 2011/0206963 A1 | 8/2011 | Fujita et al. | |
| 2015/0004465 A1 | 1/2015 | Ozaki et al. | |

FOREIGN PATENT DOCUMENTS

| | | |
|---|---|---|
| CN | 104040777 A | 9/2014 |
| CN | 104220373 A | 12/2014 |
| EP | 2 806 493 A1 | 11/2014 |
| EP | 2 837 598 A1 | 2/2015 |
| JP | 9-147916 A | 6/1997 |
| JP | 2005-327680 A | 11/2005 |
| JP | 2008-174418 A | 7/2008 |
| JP | 2012-004103 A | 1/2012 |
| JP | 2013-168361 A | 8/2013 |
| JP | 5362132 B2 | 12/2013 |
| JP | 2014-040580 A | 3/2014 |
| KR | 10-2013-0055692 A | 5/2013 |
| KR | 10-2013-0087367 A | 8/2013 |
| KR | 10-2014-0117415 A | 10/2014 |
| KR | 10-2014-0133551 A | 11/2014 |
| KR | 10-2014-0143435 A | 12/2014 |
| WO | 2005/124899 A1 | 12/2005 |
| WO | 2013/153618 A1 | 12/2015 |
| WO | 2016/098579 A1 | 6/2016 |

OTHER PUBLICATIONS

Translation of JP 2014-040580 A.
International Search Report for PCT/JP2015/083748 dated Feb. 16, 2016 [PCT/ISA/210].
Written Opinion for PCT/JP2015/083748 dated Feb. 16, 2016 [PCT/ISA/237].
Communication dated Jun. 22, 2017 from the Korean Intellectual Property Office in counterpart application No. 10-2017-7016264.
Office Action dated Oct. 25, 2017 in Korean Patent Application No. 10-2017-7016264 with English translation.
Third Office Action dated Nov. 16, 2017 in corresponding Chinese Patent Application No. 201580023493.3 with translation.
Communication from the European Patent Office dated Nov. 2, 2017 in counterpart European Patent Application No. 15869787.0.
Communication dated Mar. 20, 2018 issued by the Japanese Patent Office in counterpart Japanese application No. 2017-079158.
Communication dated Aug. 14, 2017 from the State Intellectual Property Office of the P.R.C. in counterpart Application No. 201580023493.3.

* cited by examiner

INORGANIC OXIDE POWDER, SLURRY CONTAINING SAME, NONAQUEOUS ELECTROLYTE SECONDARY BATTERY, AND METHOD FOR MANUFACTURING NONAQUEOUS ELECTROLYTE SECONDARY BATTERY

CROSS REFERENCE TO RELATED APPLICATIONS

This application is a National Stage of International Application No. PCT/JP2015/083748 filed Dec. 1, 2015, claiming priority based on Japanese Patent Application No. 2014-255465 filed Dec. 17, 2014, the contents of all of which are incorporated herein by reference in their entirety.

TECHNICAL FIELD

The present invention relates to an inorganic oxide powder which is suitably used to form an inorganic oxide porous film having insulation properties on at least one surface of a positive electrode, a negative electrode or a separator that constitutes a nonaqueous electrolyte secondary battery. The present invention also relates to a slurry containing the inorganic oxide powder, and a nonaqueous electrolyte secondary battery including an inorganic oxide porous film containing the inorganic oxide powder and a method for manufacturing the same.

BACKGROUND ART

A nonaqueous electrolyte secondary battery, especially a lithium ion secondary battery, has been used in household compact equipment such as a cell phone or a personal computer because of having high energy density. In recent years, application to automobiles has also been accelerated, in addition to the compact equipment.

The nonaqueous electrolyte secondary battery is a battery using an organic solvent-based electrolytic solution, and usually includes a positive electrode and a negative electrode, and also includes a separator disposed for the purpose of electrically insulating between these electrode plates. As a separator for a lithium ion secondary battery, for example, a microporous sheet made of a polyolefin-based resin is used.

When a short circuit occurs inside a battery, a shutdown function of the separator made of this microporous sheet leads to closing of pores of the separator so as to prevent movement of lithium ions at the short circuit part, and accordingly eliminating a battery function at the short circuit part. In such manner, the separator plays a role in maintaining safety of the lithium ion secondary battery. However, when the temperature of the battery exceeds, for example, 150° C. due to momentarily generated heat, the separator may drastically contract and the short circuit part of the positive electrode and the negative electrode may expand. In this case, the temperature of the battery may reach an abnormally overheated state of several hundred degrees centigrade or higher, and therefore, there is a problem in safety.

Patent Document 1 proposes technology of forming an inorganic oxide porous film including an inorganic oxide filler having insulation properties on a surface of a positive electrode, a negative electrode or a separator that constitutes a lithium ion secondary battery.

PRIOR ART DOCUMENT

Patent Document

Patent Document 1: JP 9-147916 A

The inorganic oxide porous film disclosed in the Patent Document mentioned above has high heat resistance and can inhibit drastic contraction of the separator.

However, even when an inorganic oxide porous film is formed using an inorganic oxide powder satisfying various physical properties disclosed in the Patent Document, the inorganic oxide porous film thus obtained has insufficient average pore radius or porosity and lacks in ion permeability, thus resulting in a problem that a nonaqueous electrolyte secondary battery such as a lithium ion secondary battery including the inorganic oxide porous film exhibits insufficient load characteristics.

In recent years, application to automobile use and the like with high density and high output capacity has been accelerated, and there is a need to thin each constituent material of a nonaqueous electrolyte secondary battery. There is also a need to ensure safety and to maintain appropriate battery performance, even when an inorganic oxide porous film is further thinned, namely, a basis weight of an inorganic oxide is reduced. However, there is an actualized problem which is that only simple reduction in a basis weight of an inorganic oxide lead to further reduction in an amount of the inorganic oxide existing on a surface, so that an advantage such as high heat resistance as a feature of the inorganic oxide is not sufficiently exhibited, or the heat resistance is drastically impaired, thus the safety cannot sufficiently be ensured.

DISCLOSURE OF THE INVENTION

Problems to be Solved by the Invention

Under these circumstances, an object of the present invention is to provide an inorganic oxide powder which is suitably used to form an inorganic oxide porous film having excellent heat resistance, insulation properties and film strength, regardless of a small basis weight, and also having porosity capable of imparting sufficient ion permeability on at least one surface of a positive electrode, a negative electrode or a separator that constitutes a nonaqueous electrolyte secondary battery typified by a lithium ion secondary battery.

Means for Solving the Problems

The inventors has intensively studied so as to solve the problems mentioned above, thus reaching to finely granulating of an inorganic oxide powder included in an inorganic oxide porous film while maintaining a special shape (three-dimensional particle unevenness) of the inorganic oxide powder.

Namely, the present invention includes the following inventions.
<1> An inorganic oxide powder, wherein:
  1) an average three-dimensional particle unevenness is 3.6 or more, and
  2) an abundance ratio in number of particles having a particle diameter of less than 0.3 μm is 50% or more.
<2> The inorganic oxide powder according to <1>, wherein the powder has a BET specific surface area is 6.0 m²/g or more.

<3> The inorganic oxide powder according to <1> or <2>, wherein the inorganic oxide is α alumina.

<4> An inorganic oxide slurry, including: the inorganic oxide powder according to any one of <1> to <3>; a binder; and a solvent.

<5> A nonaqueous electrolyte secondary battery, wherein: an inorganic oxide porous film is formed on at least one surface of a positive electrode, a negative electrode or a separator, the film having insulation properties and, including the inorganic oxide powder according to any one of <1> to <3>.

<6> The nonaqueous electrolyte secondary battery according to <5>, wherein, in the inorganic oxide porous film, a proportion of a total of a pore volume inside coating film of pores inside coating film having a pore diameter inside coating film of 0.2 μm or less, relative to a total of a pore volume inside coating film of all pores inside coating film, is 35% or more.

<7> A method for manufacturing a nonaqueous electrolyte secondary battery, including: a step of applying the inorganic oxide slurry according to <4> on at least one surface of the positive electrode, the negative electrode or the separator, followed by drying the slurry to form an inorganic oxide porous film.

Effects of the Invention

According to the present invention, there is provided an inorganic oxide powder which is suitable to form an inorganic oxide porous film having excellent heat resistance, insulation properties, and film strength, regardless of a small basis weight, and also having porosity capable of imparting sufficient ion permeability. The inorganic oxide porous film formed of the inorganic oxide powder is excellent in load characteristics because of having excellent ion permeability, and also has high heat resistance and film strength, so that a nonaqueous electrolyte secondary battery including the inorganic oxide porous film on at least one surface of a positive electrode, a negative electrode or a separator is a secondary battery which can simultaneously achieve both battery performance and safety.

MODE FOR CARRYING OUT THE INVENTION

The present invention will be described in detail below. In the present description, when the expression "to" is used for a range of a value, the range contains the upper and lower limits.

The present invention is directed to an inorganic oxide, wherein:

1) an average three-dimensional particle unevenness is 3.6 or more, and 2) an abundance ratio in number of particles having a particle diameter of less than 0.3 μm is 50% or more (hereinafter sometimes referred to as an "inorganic oxide powder of the present invention", or simply referred to as an "inorganic oxide powder").

The inorganic oxide powder of the present invention is not particularly limited as long as it is a material that has electrically insulation properties, and aluminum oxide, titanium oxide, magnesium oxide and the like can be used as an oxide component thereof. These oxides may be used alone, or two or more oxides may be used as a mixture.

Among these, aluminum oxide (alumina) is preferable, and α alumina, which is excellent in insulation properties and heat resistance and is chemically stable, is particularly preferable.

One of features of the inorganic oxide powder of the present invention is that inorganic oxide particles constituting the inorganic oxide powder have a predetermined shape (three-dimensional particle unevenness) and size.

Figure 1:
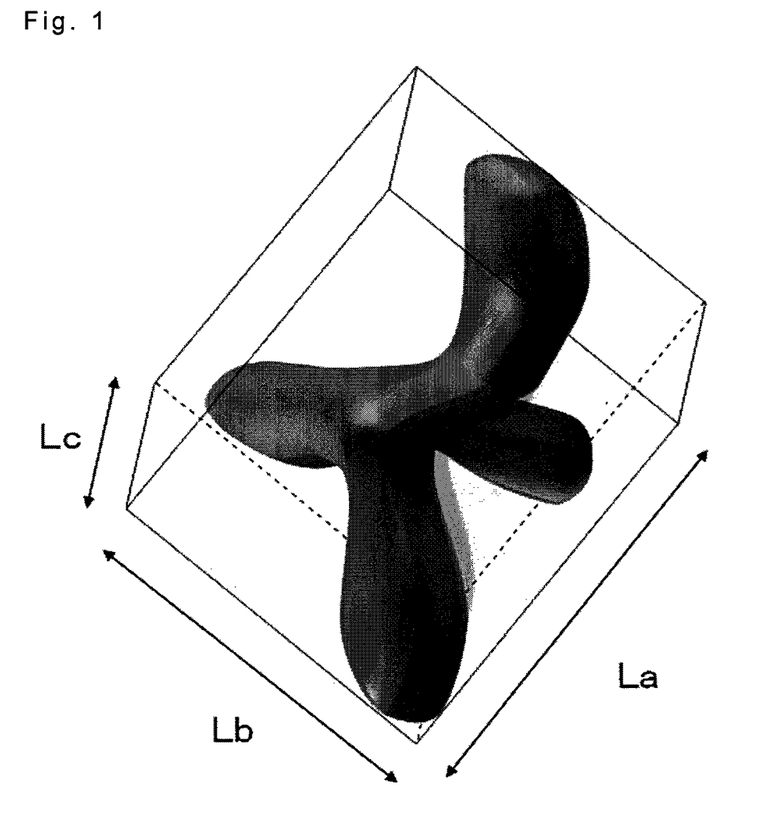
FIG. 1 is a schematic diagram for describing a three-dimensional particle unevenness.

Here, the "three-dimensional particle unevenness" is a shape parameter of one inorganic oxide particle constituting the inorganic oxide powder, which is the value defined by the following formula (1), based on a particle volume V ($\mu m^3$) and a volume of rectangular parallelepiped La×Lb×Lc ($\mu m^3$) circumscribing the particles.

$$\text{Three-dimensional particle unevenness} = La \times Lb \times Lc/V \qquad (1)$$

where La denotes a major diameter of particle, Lb denotes a middle diameter of particle, and Lc denotes a minor diameter of particle, and La, Lb and Lc are orthogonal to one another. FIG. 1 shows a schematic diagram for describing the three-dimensional particle unevenness. The "average three-dimensional particle unevenness" can be obtained as an index showing a feature of the particle shape by calculating the three-dimensional particle unevenness from 100 or more particles using the above formula (1). The average three-dimensional unevenness as used herein is the value of the three-dimensional particle unevenness corresponding to a cumulative volume of 50% calculated when cumulative volume distribution to the three-dimensional particle unevenness is determined for arbitrary particles of 100 or more.

One of features of the inorganic oxide powder of the present invention is also that the powder contains many fine particles having a particle diameter of less than 0.3 μm while having a large unevenness. Here, the "particle diameter" is one of parameters of inorganic oxide particles, which means a diameter d of a sphere having the volume which is equal to the particle volume V ($\mu m^3$) of the inorganic oxide powder, and is the value satisfying the following formula (2).

$$V = 4\pi/3 \times (d/2)^3 \qquad (2)$$

An abundance ratio in number of particles having a particle diameter of less than 0.3 μm can be obtained by calculating the "particle diameter" from 100 or more particles using the above formula (2).

The particle volume V, the major diameter La of particle, the middle diameter Lb of particle, the minor diameter Lc of particle, and the diameter d of sphere can be obtained by analyzing continuous slice images of the particles to be targeted using the three-dimensional quantitative analysis software (for example, TRI/3D-PRT manufactured by RAMC SYSTEM ENGINEERNING CO., LTD.).

The continuous slice images of the particles can be obtained in the following manner. That is, a sample for evaluation obtained by curing a particle fixing resin (epoxy resin and the like) containing a predetermined amount of the inorganic oxide powder dispersed therein is sliced by the FIB processing at specific intervals to obtain the predetermined number of continuous cross-sectional SEM images by repeatedly obtaining the cross-sectional SEM images. The obtained cross-sectional SEM images are subjected to position correction using appropriate image analysis software (for example, Avizo ver 6.0 manufactured by Visualization Sciences Group), and then the obtained continuous slice images are subjected to three-dimensional quantitative analysis.

A specific evaluation procedure of the three-dimensional particle unevenness and particle diameter (sample preparing method for continuous slice images, and calculation method for V, La, Lb, Lc and d using a three-dimensional quantitative analysis software) will be mentioned in detail in Examples, taking an alumina particle as an example.

The average three-dimensional particle unevenness of the inorganic oxide powder of the present invention defined by the above method is characterized by being 3.6 or more, preferably 3.8 or more, and more preferably 4.0 or more. The upper limit of the average three-dimensional particle unevenness is preferably 10.0 or less, and more preferably 6.0 or less.

When the average three-dimensional particle unevenness is adjusted to 3.6 or more, it is possible to improve porosity and ion permeability of the inorganic oxide porous film which is obtained by slurrying the inorganic oxide powder and applying the slurried inorganic oxide powder on a surface of a separator or that of an electrode (positive electrode or negative electrode) made of an electrode mixture layer containing an electrode active material (positive electrode active material or negative electrode active material) and a binder, followed by drying. Taking the porosity of the inorganic oxide porous film and strength thereof into consideration, the average three-dimensional particle unevenness is preferably 10 or less.

The inorganic oxide powder of the present invention is characterized by including 50% or more of particles having a particle diameter of less than 0.3 µm defined by the above-mentioned method while having a large unevenness relative to the number of all particles constituting the inorganic oxide powder (abundance ratio in number of particles having a particle diameter of less than 0.3 µm), and preferably 55% or more, more preferably 60% or more, and most preferably 65% or more. The upper limit is not particularly limited and may be 100%. When the powder includes fine particles having a large three-dimensional particle unevenness and the above-mentioned proportion, it is possible to maintain an optimum range of the porosity of the inorganic oxide porous film which is obtained by slurrying the inorganic oxide powder and applying the slurried inorganic oxide powder on a surface of a separator or that of an electrode mixture layer containing an electrode active material and a binder, followed by drying, thus leading to good ion permeability and electrolytic solution retention performance of the inorganic oxide porous film. The inorganic oxide porous film made of such particles exhibits high film strength since a contact point between particles increases and a strong three-dimensional network can be formed while maintaining the porosity, and for example heat resistance and dimensional stability of the separator are improved due to reduction in powder falling of the inorganic oxide, and thus a nonaqueous electrolyte secondary battery having higher safety is obtained.

The oxide purity of the inorganic oxide powder of the present invention is usually 99% by weight or more, preferably 99.9% by weight or more, and more preferably 99.99% by weight or more.

The "oxide purity" means the proportion of the oxide component composed of aluminum oxide, titanium oxide, magnesium oxide and the like, or a mixture thereof when the total weight of all components in the inorganic oxide powder of the present invention is regarded as 100% by weight. The measurement method will be mentioned below in Examples taking an example where a normative oxide component is α alumina.

In particular, when the inorganic oxide powder of the present invention is especially an α alumina powder, for example in battery application, it is not preferable that the purity is less than 99% by weight for the following reason. That is, impurities such as Si, Na or Fe contained in the α alumina powder increase, as a result, good electric insulation properties cannot be obtained, furthermore, mixed amount metallic foreign materials causing a short circuit increases.

The BET specific surface area of the inorganic oxide powder of the present invention is preferably 6.0 m$^2$/g or more, more preferably 6.5 m$^2$/g or more, and most preferably 7.0 m$^2$/g or more. When the BET specific surface area is within the above range, connection with the binder is improved when an inorganic oxide porous film is formed by the below-mentioned method, thus an inorganic oxide porous film having high strength is obtained.

The oxide component of the inorganic oxide powder of the present invention is preferably alumina, and particularly preferably α alumina. When the inorganic oxide powder of the present invention is α alumina, a coating film can be obtained by mixing an α alumina powder, a binder and a solvent to prepare an α alumina slurry, and applying the α alumina slurry on a surface of a separator or that of a positive electrode or a negative electrode made of an electrode mixture layer containing an electrode active material. A consolidation processing such as rolling may also be performed, whereby, it is possible to sufficiently ensure porosity of the α alumina porous film suited for ion conduction, and simultaneously, the porosity can be arbitrarily controlled within a preferable range.

A method for producing an α alumina powder suitable as the inorganic oxide powder of the present invention is not particularly limited, examples of the method for producing an α alumina powder include; a method of calcining aluminum hydroxide prepared by an aluminum alkoxide method; a synthesis method using organoaluminum; a method of calcining transition alumina, or an alumina powder which is converted into transition alumina by subjecting to a heat treatment, as a raw material, in an atmospheric gas containing hydrogen chloride; a method disclosed in JP 2010-150090 A, JP 2008-100903 A, JP 2002-047009 A or JP 2001-354413 A; and the like.

The aluminum alkoxide method includes, for example, a method of hydrolyzing an aluminum alkoxide with water to give a slurry-, sol-, or gel-like aluminum hydroxide, followed by drying to obtain a dry-powdered aluminum hydroxide and the like.

The powdered aluminum hydroxide obtained by drying is a bulky powder which usually has an untamped density within a range of about 0.1 to 0.4 g/cm$^3$, and preferably 0.1 to 0.2 g/cm$^3$. The powdered aluminum hydroxide is not limited thereto, and the thus obtained aluminum hydroxide powder may be used after adjusting to an arbitrary bulk density by making the bulk density higher at post-process and the like.

A cumulative pore volume (pore radius is within a range of 0.01 µm or more and 1 µm or less) of aluminum hydroxide is not particularly limited, and is preferably 0.6 mL/g or more. In this case, because of small primary particle, excellent dispersibility, and less agglomerated particles, an alumina calcined body obtained by calcination can prevent the generation of alumina agglomerated particles that are strongly coupled and are hard to crush.

A method for measuring the pore volume is as follows.

A sample devoted to the measurement is dried by a dryer at a temperature of 120° C. for 4 hours and the sample after drying is precisely weigh for taking it as sample weight.

The sample after drying is set to a cell of the pore volume measuring device ("Auto Pore III9420" manufactured by MICROMERITICS), and mercury is filled within the system after inside the cell system is dropped below 50 µmHg. Then, pressure is gradually applied to the cell from 0.007 MPa to 414 MPa to measure the amount of mercury penetration, under each pressure, by setting penetration equilibrium waiting time of mercury at 10 seconds.

The cumulative pore volume (mL/g) is determined by dividing the total amount of mercury intrusion (mL) at the time when pressure is applied from 0.007 MPa to 414 MPa by the sample weight (g).

The objective α alumina powder can be obtained by calcining the dry-powdered aluminum hydroxide obtained by the aluminum alkoxide method.

The aluminum hydroxide is usually calcined in a state of being filled into a calcination container. The calcination container includes, for example, sheath saggar and the like.

A material of the calcination container is preferably alumina from the viewpoint of the prevention of contamination of the thus obtained α alumina powder, and particularly preferably high-purity α alumina. From the viewpoint of heat resistance and usage cycle characteristic of the calcination container, a material containing silica or a magnesia component and the like in an appropriate range may be used.

A method for filling the aluminum hydroxide into the calcination container is not particularly limited, and the aluminum hydroxide may be filled into the calcination container by the self-weight, or filled after consolidation.

Examples of the calcination furnace to be used for calcination of the aluminum hydroxide include a material stationary-type calcination furnaces typified by a tunnel kiln, a batch-type air flow-type box type calcination furnace or a batch-type air co-flow box-type calcination furnace and the like, a rotary kiln or an electric furnace and the like.

The calcination temperature of the aluminum hydroxide, the temperature rise rate to the calcination temperature, and the calcination time are appropriately selected so as to obtain α alumina having desired physical properties.

The calcination temperature of the aluminum hydroxide is, for example, 1,000° C. or higher and 1,450° C. or lower, and preferably 1,000° C. or higher and 1,350° C. or lower. The temperature rise rate when the temperature is raised to this calcination temperature is usually 30° C./hour or more and 500° C./hour or less. The calcination times of the aluminum hydroxide is usually 0.5 hour or more and within 24 hours, and preferably 1 hour or more and within 20 hours.

The aluminum hydroxide may be calcined, for example, in an air atmosphere, or in an inert gas atmosphere such as a nitrogen gas or argon gas, or may be calcined in an atmosphere with high water vapor partial pressure, as in a gas furnace for calcination by burning of a propane gas and the like. Usually, when calcined in an atmosphere with high water vapor partial pressure, the thus obtained particles are easily baked and densified by the effect of water vapor, unlike calcination in the air atmosphere.

The α alumina powder thus obtained after calcination is sometimes agglomerated in a state where the average particle diameter exceeds 10 µm. In that case, it is preferred to crush the powder as long as the shape of particles is not impaired.

In that case, the powder can be crushed using, for example, known devices such as a vibration mill and a jet mill, and it is possible to use either a method of crushing in a dry state or a method of crushing in a wet state. However, in the case of crushing using media such as a ceramic ball, there arises problems such as inclusion of a media abrasion powder, contamination of an inorganic oxide powder with impurities due to contact between media and the inorganic oxide powder, or degradation of unevenness of an inorganic oxide powder due to collision between media and the inorganic oxide powder. Therefore, it is preferred to perform medialess crushing. When the powder is crushed in a dry state, known auxiliary agents may be added for the purpose of improving productivity.

The inorganic oxide powder of the present invention may be subjected to a surface treatment and the like. Examples of the method of a surface treatment include, but are not limited to, a method of using a surface treatment agent such as a coupling agent or a surfactant. The coupling agent may have a functional group such as an amino group, an epoxy group, or an isocyanate group in a molecular structure thereof. The surface treatment of the inorganic oxide powder with a coupling agent having these functional groups exerts the effect such as improvement of binding with a binder, and improvement of dispersibility of the inorganic oxide powder in the below-mentioned inorganic oxide slurry.

The inorganic oxide slurry of the present invention includes the above-mentioned inorganic oxide powder of the present invention, binder and solvent.

It is possible to use known binders, for example, fluororesins such as polyvinylidene fluoride (PVDF), polytetrafluoroethylene (PTFE) and a tetrafluoroethylene-hexafluoropropylene copolymer (FEP); polyacrylic acid derivatives such as polyacrylic acid, polymethyl acrylate, polyethyl acrylate and polyhexyl acrylate; polymethacrylic acid derivatives such as polymethacrylic acid, polymethyl methacrylate, polyethyl methacrylate and polyhexyl methacrylate; polyamide, polyimide, polyamideimide, polyvinyl acetate, polyvinylpyrrolidone, polyether, polyethersulfone, hexafluoropolypropylene, a styrene-butadiene rubber, carboxymethyl cellulose (hereinafter referred to as CMC), polyacrylonitrile, and derivatives thereof, polyethylene, polypropylene, an aramid resin and the like, or salts thereof. These binders may be used alone, or two or more binders may be used as a mixture.

It is also possible to use a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

It is possible to use known solvents, for example, water, alcohol, acetone, tetrahydrofuran, methylene chloride, chloroform, dimethylformamide, N-methyl-2-pyrrolidone (NMP), cyclohexane, xylene, cyclohexanone or mixed solvents thereof.

The content of the binder in the inorganic oxide slurry of the present invention is not particularly limited, for example, and is preferably within a range of 0.1 to 20 parts by weight relative to 100 parts by weight of the inorganic oxide powder of the present invention. The content of the solvent in the inorganic oxide slurry of the present invention is not particularly limited, for example, and is preferably within a range of 10 to 500 parts by weight relative to 100 parts by weight of the inorganic oxide powder of the present invention.

Various additives having a function such as dispersants, thickeners, leveling agents, antioxidants, defoamers, pH adjustors containing an acid or alkali, and additives having a function such as inhibition of side reaction such as decomposition of an electrolytic solution may be added to the inorganic oxide slurry of the present invention, in addition to the above-mentioned components, for the purpose of dispersion stabilization or improvement in coatability. These additives are not particularly limited as long as they are chemically stable within a range of use of the nonaqueous electrolyte secondary battery, and do not exert a large influence on a battery reaction. These various additives are preferably those capable of being removed when the inorganic oxide porous film is formed, but may remain in the porous film. The content of each additive is not particularly limited, for example, and is preferably 10 parts by weight or less relative to 100 parts by weight of the inorganic oxide powder of the present invention.

The inorganic oxide slurry of the present invention can be prepared by mixing the inorganic oxide powder of the present invention, a binder, and a solvent, followed by dispersion. A method for dispersing the inorganic oxide slurry is not particularly limited, and it is possible to use a stirring method using a known planetary mixer and the like, or a dispersing method using ultrasonic irradiation.

The inorganic oxide porous film produced from the thus obtained inorganic oxide slurry has high heat resistance and exhibits insulation properties. This inorganic oxide porous film is formed on at least one surface of a positive electrode, a negative electrode or a separator, and is suitably used in a nonaqueous electrolyte secondary battery including an electrode group (laminated type electrode group) formed by laminating together with a positive electrode, a negative electrode and a separator, or an electrode group (wound type electrode group) formed by laminating the inorganic oxide porous film together with a positive electrode, a negative electrode and a separator and then winding, and an electrolytic solution.

The method for suitably manufacturing such nonaqueous electrolyte secondary battery includes a method including the step of applying the above-mentioned inorganic oxide slurry on a surface of a positive electrode and/or a negative electrode made of an electrode mixture layer containing an electrode active material (positive electrode active material or negative electrode active material) and a binder, followed by drying the slurry to form an inorganic oxide porous film. The method may also be a manufacturing method including the step of applying the above-mentioned inorganic oxide slurry on a separator, in place of a surface of a positive electrode and/or a negative electrode, followed by drying the slurry to form an inorganic oxide porous film.

More specific manufacturing method, for example, a method for manufacturing a nonaqueous electrolyte secondary battery including a wound type electrode group in which an inorganic oxide porous film is formed on a negative electrode includes a method in which one end of a negative electrode lead is joined to the negative electrode lead joining part imparted with an inorganic oxide porous film on a surface and the other end of the negative electrode lead is joined to a positive electrode lead joining portion, and the positive electrode and the negative electrode are laminated via a separator and wound to form a wound type electrode group, and then this electrode group is stored in a battery can in a state of that the group is interposed between upper and lower insulation rings, followed by injection of an electrolytic solution and further sealing with a battery cap.

There is no particular limitation on a method for applying the inorganic oxide slurry on a surface of an electrode mixture layer containing a positive electrode active material or negative electrode active material and a binder or a surface of a separator surface and, for example, a known doctor blade method or a gravure printing method and the like can be used. There is also no particular limitation on a drying method, and a known hot-air drying or vacuum drying method and the like can be used. The thickness of the inorganic oxide porous film obtained in that case is preferably within a range of about 0.3 to 20 μm, and more preferably about 0.5 to 10 μm.

There is no particular limitation on battery constituent materials of a positive electrode, a negative electrode, a separator, an electrolytic solution and the like of a nonaqueous electrolyte secondary battery, and conventionally known materials can be used. For example, materials disclosed in known document such as WO 09/041722 A can be used.

The nonaqueous electrolyte secondary battery of the present invention manufactured by the above-mentioned manufacturing method includes an inorganic oxide porous film made of the inorganic oxide powder of the present invention.

One of features of the inorganic oxide porous film made of the inorganic oxide powder of the present invention is that fine pores are included inside coating film. In the present description, the "inorganic oxide porous film" is sometimes referred to as a "coating film".

Figure 2:
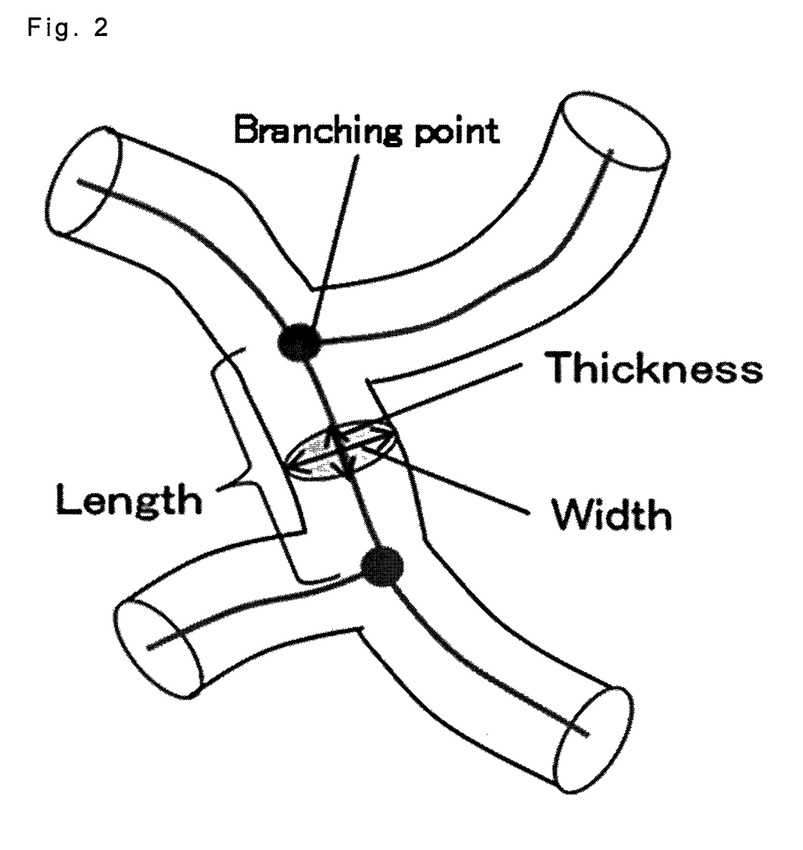
FIG. 2 is a schematic diagram for describing a pore diameter inside coating film, and a pore volume inside coating film.

Here, a property of the inorganic oxide porous film (coating film) can be expressed by a "pore diameter inside coating film" and a "pore volume inside coating film" described below as parameters. A schematic diagram for describing a pore diameter inside coating film, and a pore volume inside coating film is shown in FIG. 2.

The "pore diameter inside coating film" is one of parameters which can be determined from three-dimensional analysis of the inorganic oxide porous film in the same manner as in three-dimensional particle unevenness. When a region between branching points of a void shown in FIG. 2 is regarded as one pore and this is defined as a pore inside coating film (hereinafter sometimes referred simply to as a "pore"), the "pore diameter inside coating film" is the value obtained by dividing the sum of a minor diameter (Thickness) and a major diameter (Width) of the pore shown in FIG. 2 by 2, which is defined by the following formula (3).

$$\text{Pore diameter inside coating film} = (\text{Thickness} + \text{Width})/2 \qquad (3)$$

In the case of determining the pore diameter inside coating film, the particle portion and the void portion are distinguished by binarizing an inorganic oxide porous film using three-dimensional analysis. With respect to the distinguished void portion, line thinning processing is performed on software, and a linkage point of three or more networks or networks each having a different width is regarded as a branching point of a pore inside coating film. With respect to pores inside coating film between all branching points, a minor diameter (Thickness), a major diameter (Width) and a distance between branching points (Length) are calculated.

The pore volume inside coating film (hereinafter sometimes referred simply to as a "pore volume") is the value which is obtained by calculating a cross-sectional area (CS) of pores from a minor diameter (Thickness) and a major diameter (Width) by the following formula (4), and defining from the thus obtained cross-sectional area and pore length (distance between branching points (Length)) by the following formula (5).

$$CS=(\text{Thickness}/2)\times(\text{Width}/2)\times\pi \quad (4)$$

$$\text{Pore volume inside coating film}=CS\times\text{Length} \quad (5)$$

It is also possible to determine pore distribution inside coating film in the coating film from the thus obtained pore diameter and pore volume in pores inside coating film, and to determine a volume proportion of pores having a pore diameter within a specific range.

In order that the inorganic oxide porous film according to the present invention has more excellent heat resistance, insulation properties and film strength, a volume proportion of pores having a pore diameter of 0.2 µm or less are preferably larger, among pores inside coating film. More specifically, when the volume proportion of pores having a pore diameter of 0.2 µm or less is defined by the proportion of a total of a pore volume of pores having a pore diameter of 0.2 µm or less relative to a total of a pore volume of all pores inside coating film in the inorganic oxide porous film (coating film) according to the present invention (("total of a pore volume of pores having a pore diameter of 0.2 µm or less"/"total of a pore volume of all pores inside coating film"), the proportion is preferably 35% or more, more preferably 40% or more, and most preferably 50% or more (including 100%).

When the volume proportion of pores having a pore diameter of 0.2 µm or less satisfies the above requirements, the inorganic oxide porous film according to the present invention has more excellent heat resistance, insulation properties and film strength. Therefore, a nonaqueous electrolyte secondary battery including such the inorganic oxide porous film is excellent in heat resistance and dimensional stability at the shutdown temperature of a separator, leading to more excellent safety.

A specific evaluation procedure of the pore diameter inside coating film and pore volume inside coating film (sample preparing method for continuous slice images, and calculation method for each value using a three-dimensional quantitative analysis software) will be mentioned in detail in Examples, taking an inorganic oxide porous film made of an alumina coating film as an example.

It is also one of features that the inorganic oxide porous film made of the inorganic oxide powder of the present invention has a sufficient porosity. In the inorganic oxide porous film according to the present invention, the porosity defined below is preferably within a range of 30 to 75%, and more preferably 35 to 70%.

When the porosity satisfies the above requirements, the inorganic oxide porous film according to the present invention has more excellent ion permeability. Therefore, a nonaqueous electrolyte secondary battery including such the inorganic oxide porous film is excellent in ion permeability.

Here, the "porosity" in the present invention is a parameter indicating a void inside the inorganic oxide porous film, and can be determined by three-dimensional analysis of the inorganic oxide porous film in an analysis region. The porosity is the value obtained by dividing the total volume (BV) of the void portion by the total volume (TV) in the analysis region, with respect to the void portion distinguished by binarizing into the particle portion and the void portion using three-dimensional analysis, which is defined by the following formula (6):

$$\text{Porosity}=BV/TV \quad (6)$$

A specific evaluation procedure of the porosity (sample preparing method for continuous slice images, and calculation method for each value by using a three-dimensional quantitative analysis software) will be detailed in Examples, taking an inorganic oxide porous film made of an alumina coating film as an example.

As mentioned above, when the volume proportion of pores or porosity satisfies the above requirements in the inorganic oxide porous film according to the present invention, because of having high ion permeability while having more excellent heat resistance, insulation properties and film strength, a nonaqueous electrolyte secondary battery including such the inorganic oxide porous film can simultaneously achieve both safety and battery performance, and is excellent.

In the case of a laminated porous film in which this inorganic oxide porous film is formed, for example, on a separator, air permeability is often used as a battery performance and is usually indicated by the Gurley value. The Gurley value indicated by the number of seconds that an air permeates from one face to the other face, and is preferably within a range of 30 to 1,000 seconds/100 cc, more preferably 50 to 500 seconds/100 cc, and most preferably 50 to 350 seconds/100 cc, though the Gurley value of the laminated porous film varies depending on a base material porous film as a separator.

In the case of a laminated porous film in which this inorganic oxide porous film is formed, for example, on a separator, dimensional stability of the laminated porous film in a high temperature range at which shutdown occurs is often used as evaluation of safety, and is usually indicated by a heat shape retention ratio. In general, the heat shape retention ratio of the laminated porous film is preferably 80% or more, more preferably 85% or more, and most preferably 90% or more. The high temperature range at which shutdown occurs as used herein is within a range of 80 to 180° C., and may refer to a rage of about 130 to 170° C.

EXAMPLES

The present invention will be described in detail by way of Examples, but the present invention is not limited only to the following Examples. Methods for evaluation of the respective physical properties are as follows.

(Oxide Purity)

Oxide purity (% by weight) of an inorganic oxide powder was determined from the following calculation formula by regarding the total of the weight of oxide (α alumina) as a reference, and the sum of the weights of $SiO_2$, $Na_2O$, MgO, CuO, $Fe_2O_3$, and $ZrO_2$ included in the oxide as the reference as 100 (% by weight). $SiO_2$, $Na_2O$, MgO, CuO, $Fe_2O_3$ and $ZrO_2$ are defined as impurities to oxide (a alumina) as the reference.

Oxide purity(% by weight)=100−sum of weights of impurities(% by weight)

The weights of $SiO_2$, $Na_2O$, MgO, CuO and $Fe_2O_3$ as impurities were determined by converting the contents of Si, Na, Mg, Cu, and Fe, which are obtained by measuring a sample for evaluation using solid-state emission spectrometry, and the weight of $ZrO_2$ as the remaining impurity was determined by converting the content of Zr, which is obtained by measuring a sample for evaluation using ICP emission spectroscopy, into the weights of oxides ($SiO_3$, $Na_2O$, MgO, CuO, $Fe_2O_3$, $ZrO_2$) corresponding to each element.

(BET Specific Surface Area)

Using "Flow Sorb II 2300" manufactured by Shimadzu Corporation as a specific surface area measuring apparatus, a BET specific surface area was determined by the nitrogen absorption method (one point method) in accordance with the method defined in JIS-Z8830 (2013).

(Average Three-Dimensional Particle Unevenness, Particle Diameter)

2 parts by weight of a dispersant and 2 parts by weight of an alumina particle powder were dispersed into 100 parts by weight of an epoxy resin. After vacuum deaeration, 12 parts by weight of a curing agent was added and the thus obtained alumina dispersed epoxy resin was poured into a silicon mold, followed by curing.

After a cured sample was fixed to a sample stage, Pt—Pd was vacuum-deposited and the sample was set to FIB-SEM (HELIOS 600 manufactured by FEI). The FIB processing was applied to the sample at an accelerating voltage of 30 kV to form a cross section, and the cross section was observed by SEM at an accelerating voltage of 2.1 kV. After observation, the FIB processing was again applied to the sample with a thickness of 20 nm in a depth direction of the sample to form a new cross section, and the cross section was observed by SEM. In this manner, the FIB processing and SEM observation of the cross section were repeated at intervals of 20 nm to obtain continuous images more than 100 images. A position correction was made by the image analysis software (Avizo ver. 6.0 manufactured by Visualization Sciences Group) to obtain continuous slice images. The scale was set to 19 nm/pix for X-axis and Y-axis, and 20 nm/pix for Z-axis.

A three-dimensional analysis of the alumina particles was applied to the obtained continuous slice images to calculate a three-dimensional particle unevenness and a particle diameter. For the three-dimensional quantitative analysis, the quantitative analysis software TRI/3D-PRT (manufactured by RATOC SYSTEM ENGINEERING CO., LTD.) was used.

The three-dimensional quantitative analysis was made as follows. That is, files of the continuous slice images were firstly open on the TRI/3D-PRT, noises are removed by applying a median filter. Subsequently, three-dimensionally isolated particles are respectively distinguished and labeled, and then particles which are cut by a circumference of a measuring area were removed.

A particle volume V of an arbitrary particle, a major diameter La, a middle diameter Lb and a minor diameter Lc of the particle were determined from 100 or more particles which were left unremoved in the above processing. A particle diameter d and a three-dimensional particle unevenness were calculated from the above formulas (1) and (2). The average three-dimensional particle unevenness was calculated, excluding particles having a particle diameter of less than 0.3 μm and more than 1 μm. Namely, the average three-dimensional particle unevenness was determined as the value of particles having a particle diameter of 0.3 μm or more and 1 μm or less.

(Preparation of Base Material Porous Film (Separator))

70% by weight of an ultra-high molecular weight polyethylene powder (340M, manufactured by Mitsui Chemicals, Inc.) and 30% by weight of a polyethylene wax having a weight average molecular weight of 1,000 (ENP-0115, manufactured by Nippon Seiro Co., Ltd.) were added, and 0.4 part by weight of an antioxidant (Irg1010, manufactured by Ciba Specialty Chemicals Inc.), 0.1 part by weigh of an antioxidant (PI68, manufactured by Ciba Specialty Chemicals Inc.), and 1.3 parts by weight of sodium stearate were added relative to 100 parts by weight of the total amount of the ultra-high molecular weight polyethylene and the polyethylene wax, and then calcium carbonate having an average particle diameter of 0.1 μm (manufactured by Maruo Calcium Co., Ltd.) was added so that the proportion became 38% by volume relative to the total volume. After mixing them in the form of a powder using a Henschel mixer, the thus obtained powder mixture was melt-kneaded by a twin-screw kneader to obtain a polyolefin resin composition. The polyolefin resin composition was rolled by a pair of rolls at a surface temperature of 150° C. to form a sheet. This sheet was immersed in an aqueous hydrochloric acid solution (hydrochloric acid of 4 mol/L, nonionic surfactant of 0.5% by weight) to remove calcium carbonate. Subsequently, the sheet was stretched by six times at 105° C. to obtain a base material porous film (film thickness: 16.2 μm, basis weight: 7.3 g/m$^2$, air permeability: 140 seconds/100 cc).

(Preparation of Laminated Porous Film for Evaluation)

A laminated porous film for evaluation was formed as a sample film for evaluation of an inorganic oxide porous film by the following method.

CMC; part number 1110 manufactured by Daicel FineChem Ltd. (3 parts by weight), isopropyl alcohol (51.6 parts by weight), pure water (292 parts by weight) and an oxide (α alumina) powder as a reference (100 parts by weight) were mixed in this order, followed by stirring. After ultrasonic dispersion for 10 minutes, circulation dispersion was performed for 21 minutes using Creamix ("CLM-0.8S", manufactured by M Technique Co., Ltd.), and then the thus obtained dispersion was filtered through a net with 10 μm mesh size to prepare a slurry.

Subsequently, using a bar coater (#20), the slurry was applied on the base material porous film and dried at a drying temperature of 65° C. to obtain a laminated porous film for evaluation in which an inorganic oxide porous film is formed on a surface of the base material porous film.

(Slurry Viscosity)

Using "TVB10M" manufactured by TOKI SANGYO CO., LTD. as a viscometer of a slurry used in the case of forming the laminated porous film for evaluation, the measurement was performed by rotating a No. 3 rotor at 6 rpm.

(Pore Diameter Inside Coating Film, Pore Volume Inside Coating Film, and Porosity)

A laminated porous film for evaluation was impregnated with an epoxy resin, followed by curing. After a cured sample was fixed to a sample stage and the FIB processing was applied to the sample by FIB-SEM [(HELIOS600) manufactured by FEI] to form a cross section, and the cross section (surface of the inorganic oxide porous film) was observed by SEM at an accelerating voltage of 2.1 kV. After observation, the FIB processing was again applied to the sample with a thickness of 20 nm in a depth direction (film thickness direction of the inorganic oxide porous film) of the sample to form a new cross section, and the cross section was observed by SEM. In this manner, the FIB processing and SEM observation of the cross section were repeated at intervals of 20 nm to obtain continuous slice images including the total thickness of the inorganic oxide porous film. A position correction was made by the image analysis software (Avizo ver. 6.0 manufactured by Visualization Sciences Group) to obtain continuous slice images. The scale was set to 10.4 nm/pix for X-axis and Y-axis, and 20 nm/pix for Z-axis.

Using quantitative analysis software TRI/3D-BON (manufactured by RATOC SYSTEM ENGINEERNING CO., LTD.), three-dimensional analysis of the coating film was applied to the obtained continuous slice images to calculate a pore diameter inside coating film, a pore volume inside coating film and porosity.

The three-dimensional quantitative analysis is made as follows. That is, files of the continuous slice images were firstly opened on TRI/3D-BON and a median filter (3D, 3×3) was applied, and then the particle portion and the void portion were distinguished by binarization using Auto-LW.

With respect to the void portion distinguished by the above processing, noises were removed under the conditions of 2D Ers Sml=1 and 3D Ers Sml=5. Then, the value of the Thickness parameter was subjected to a calculation processing under the conditions of MIL=0.5, NdNd=1.5 and NdTm=2.0. The minor diameter Thickness, the major diameter Width, the distance between branching points Length, the total volume BV of the void portion and the total volume TV of an analysis region were determined to define pores inside coating film, and then a pore diameter inside coating film, a pore volume inside coating film, and a porosity were calculated from the above formulas (3), (5), and (6).

(Volume Proportion of Pores Having Pore Diameter of 0.2 μm or Less)

Pore distribution inside coating film was determined from the pore diameter inside coating film and the pore volume inside coating film obtained by the above method. Among pores inside coating film, the volume proportion of pores having a pore diameter of 0.2 μm or less ("total of a pore volume of pores having a pore diameter of 0.2 μm or less"/"total of a pore volume of all pores inside coating film") was calculated. In the case of this pore distribution inside coating film (volume proportion of pores having a pore diameter of 0.2 μm or less), a region of 17.6 μm×11.3 μm×4.8 μm (954.6 μm$^3$) was set as the measurement range.

(Coating Film Thickness of Inorganic Oxide Porous Film)

The thickness (unit: μm) was measured by a high-accuracy digital measuring instrument "VL-50A" manufactured by Mitutoyo Corporation. A coating film thickness of the inorganic oxide porous film was calculated by subtracting the thickness of the base material porous film from the thickness of the laminated porous film.

(Basis Weight of Inorganic Oxide Porous Film)

The laminated porous film was cut into pieces measuring 8 cm×8 cm and the weight W (g) was measured, and then a basis weight (g/m$^2$) of a laminated porous film=W/(0.08×0.08) was calculated.

The basis weight of the inorganic oxide porous film was calculated by subtracting a basis weight of the base material porous film.

(Heat Shape Retention Ratio)

The laminated porous film was cut into pieces measuring 8 cm×8 cm, and the cut out film on which a tetragon measuring 6 cm×6 cm was drawn was interposed between papers, followed by putting in an oven heated at 150° C. After one hour, the film was taken out from the oven and the size of the side of the tetragon drawn on the film was measured, and then a heat shape retention ratio was calculated. The calculation method is as follows.

Length of line drawn in MD direction before heating: L1
Length of line drawn in MD direction after heating: L2

$$\text{MD heat shape retention ratio}(\%)=(L2/L1)\times 100$$

Each of L1 and L2 was an average of both right and left sides in MD direction of a drawn square. MD direction as used herein means a long direction during forming of the base material porous film sheet.

(Air Permeability)

In accordance with JIS P8117 (2009), Gurley value of the laminated porous film was measured by a Gurley type densometer manufactured by Toyo Seiki Seisaku-Sho, Ltd.

(Powder Falling Properties of Inorganic Oxide Porous Film (Powder Falling Ratio))

The measurement was performed in a surface rubbing test using a reciprocating abrasion tester "TRIBOGEAR TYPE: 30" manufactured by Shinto Scientific Co., Ltd. One white cloth (Kanakin No. 3) was attached to a rubbing portion of the reciprocating abrasion tester and brought into contact with the inorganic oxide porous film side of the laminated inorganic porous film under a load of 50 g/m$^2$. After performing 100 reciprocations at a rate of 6,000 ram/minute (50 mm stroke) in an MD direction, the weight B (g) of the inorganic oxide porous film existing in the rubbing portion was calculated from a basis weight (g/m$^2$) of the above-mentioned inorganic oxide porous film and the total area (m$^2$) of the rubbing portion, and then a powder falling ratio (% by weight) was determined from the weight of the laminated porous film before and after the reciprocating abration test using the following formula. It can be said that lower powder falling ratio (% by weight) leads to higher film strength.

$$\text{Powder falling ratio}(\% \text{ by weight})=\{(\text{film weight before reciprocating abrasion})-(\text{film weight after reciprocating abrasion})\}/B\times 100$$

Example 1

First, aluminum isopropoxide prepared from aluminum having a purity of 99.99% as a raw material was hydrolyzed with water to obtain a slurry-like aluminum hydroxide, and then dried to obtain a dry-powdered aluminum hydroxide having an untamped density of 0.1 g/cm$^3$.

Furthermore, this dry-powdered aluminum hydroxide was calcined by holding in an electric furnace under an air atmosphere at 1,200° C. for 2.5 hours, and the agglomerated particles were crushed by a jet mill to obtain an α alumina powder (1).

Each content of impurities of the thus obtained α alumina powder (1) was as follows: Si=8 ppm, Fe=31 ppm, Cu=1 ppm or less, Na=2 ppm, Mg=1 ppm or less and Zr=10 ppm or less, and oxide purity was 99.99% by weight or more on an alumina basis. The BET specific surface area was 7.5 m$^2$/g, the average three-dimensional particle unevenness of 100 or more particles by FIB-SEM was 5.0, and the abundance ratio in number of particles having a particle diameter of less than 0.3 μm was 77.0%.

Furthermore, an α alumina slurry was prepared from the α alumina powder (1) by the above-mentioned method, as a result, the viscosity was 48 mPa·s. This slurry was applied on a base material porous film to form a laminated porous film for evaluation in which an inorganic oxide porous film is formed on a surface. The porosity of the inorganic oxide porous film by FIB-SEM was 52.0%, and pore distribution inside coating film (volume proportion of pores having a pore diameter of 0.2 μm or less) was 61.9%. The heat shape retention ratio of the thus obtained laminated porous film was 93.0%. In addition, the evaluation results of coating film thickness, basis weight, air permeability, powder falling properties and the like are shown in Tables 1 and 2. The inorganic oxide porous film thus obtained has sufficient porosity to ion permeation, pore diameter inside coating film, air permeability, high heat resistance and film strength. Therefore, it is apparent that, when using this inorganic oxide powder, a nonaqueous electrolyte secondary battery having good battery performance regardless of a small basis weight, and also having high safety is obtained.

Comparative Example 1

The same operation as in Example 1 was performed, except for using an α alumina powder obtained by changing only calcination conditions to conditions of holding in a gas furnace in which calcination was performed by combustion of a propane gas at 1,220° C. for 4 hours, in place of the α alumina powder (1) obtained in Example 1, and an α alumina powder (2) was obtained.

Each content of impurities of the thus obtained α alumina powder (2) was as follows: Si=5 ppm, Fe=4 ppm, Cu=1 ppm or less, Na=2 ppm, Mg=1 ppm Zr=10 ppm or less, and oxide purity was 99.99% by weight or more on an alumina basis. The BET specific surface area was 4.4 m$^2$/g, the average three-dimensional particle unevenness of 100 or more particles by FIB-SEM was 4.4, and the abundance ratio in number of particles having a particle diameter of less than 0.3 μm was 25.1%.

Furthermore, the viscosity of a slurry prepared from the α alumina powder (2) by the above-mentioned method was 53 mPa·s. This slurry was applied on a base material porous film to form a laminated porous film for evaluation in which an inorganic oxide porous film is formed on a surface. The porosity of the inorganic oxide porous film by FIB-SEM was 54%, and pore distribution inside coating film (volume proportion of pores having a pore diameter of 0.2 μm or less) was 21.4%. The heat shape retention ratio of the thus obtained laminated porous film was 32%. In addition, the evaluation results of coating film thickness, basis weight, air permeability, powder falling properties and the like are shown in Tables 1 and 2.

TABLE 1

| | Coating solution | Average three-dimensional particle unevenness (—) | Abundance ratio in number of particles having a particle diameter of less than 0.3 μm (%) | BET specific surface area (m$^2$/g) |
|---|---|---|---|---|
| Example 1 | Alpha (α) alumina powder (1) | 5.0 | 77.0 | 7.5 |
| Comparative Example 1 | Alpha (α) alumina powder (2) | 4.4 | 25.1 | 4.4 |

The present application claims priority on Japanese Patent Application No. 2014-255465 filed on Dec. 17, 2014, the disclosure of which is incorporated by reference herein.

INDUSTRIAL APPLICABILITY

The inorganic oxide powder of the present invention can provide an inorganic oxide porous film for use in a nonaqueous electrolyte secondary battery, which is excellent in ion conductivity, and also has high porosity, high film strength and heat resistance. The inorganic oxide porous film is excellent in ion conductivity and heat resistance, regardless of a small basis weight, and a nonaqueous electrolyte secondary battery including the inorganic oxide porous film on at least one surface of a positive electrode, a negative electrode, or a separator is industrially promising since the secondary battery thus obtained is excellent in battery performance and safety.

The invention claimed is:

1. An α alumina powder, wherein:
   1) an average three-dimensional particle unevenness is 3.6 or more and 10 or less, and
   2) an abundance ratio in number of particles having a particle diameter of less than 0.3 μm is 50% or more.

2. An α alumina slurry, comprising: the α alumina powder according to claim 1; a binder; and a solvent.

3. A nonaqueous electrolyte secondary battery, wherein: an α alumina porous film is formed on at least one surface of a positive electrode, a negative electrode or a separator, the film having insulation properties and, comprising the α alumina powder according to claim 1.

4. The nonaqueous electrolyte secondary battery according to claim 3, wherein, in the α alumina porous film, a proportion of a total of a pore volume inside coating film of pores inside coating film having a pore diameter inside coating film of 0.2 μm or less, relative to a total of a pore volume inside coating film of all pores inside coating film, is 35% or more.

5. A method for manufacturing a nonaqueous electrolyte secondary battery, comprising: a step of applying the α alumina slurry according to claim 2 on at least one surface of the positive electrode, the negative electrode or the separator, followed by drying the slurry to form an α alumina porous film.

* * * * *

TABLE 2

| | Thickness of coating film (μm) | Porosity (%) | Volume proportion of pores having a pore diameter of 0.2 μm or less (%) | MD heat shape retention ratio (%) | Basis weight (g/m$^2$) | Air permeability (sec/100 cc) | Powder falling ratio (%) |
|---|---|---|---|---|---|---|---|
| Example 1 | 5.0 | 52.0 | 61.9 | 93.0 | 8.7 | 207.0 | 55.0 |
| Comparative Example 1 | 5.9 | 54.0 | 21.4 | 32.0 | 9.1 | 226.0 | 80.0 |